(12) United States Patent
Codilian et al.

(10) Patent No.: US 6,674,600 B1
(45) Date of Patent: Jan. 6, 2004

(54) DISK DRIVE HAVING SEPARATE MOTION SENSORS FOR BASE AND ACTUATOR

(75) Inventors: Raffi Codilian, Irvine, CA (US); Charles R. Patton, III, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 491 days.

(21) Appl. No.: 09/585,101

(22) Filed: May 31, 2000

(51) Int. Cl.$^7$ .............................................. G11B 21/02
(52) U.S. Cl. ....................................................... 360/75
(58) Field of Search ................................ 360/75, 77.02, 360/77.04

(56) References Cited

U.S. PATENT DOCUMENTS

| | | | |
|---|---|---|---|
| 5,426,545 A | * 6/1995 | Sidman et al. | 360/78.09 |
| 5,521,772 A | 5/1996 | Lee et al. | |
| 5,663,847 A | 9/1997 | Abramovitch | |
| 5,666,236 A | * 9/1997 | Bracken et al. | 360/75 |
| 6,166,874 A | * 12/2000 | Kim | 360/75 |
| 6,341,048 B1 | * 1/2002 | Morris et al. | 360/77.08 |
| 6,496,323 B1 | * 12/2002 | Umeda et al. | 360/78.09 |

FOREIGN PATENT DOCUMENTS

WO 97/02532 1/1997

* cited by examiner

*Primary Examiner*—David Hudspeth
*Assistant Examiner*—Mitchell Slavitt
(74) *Attorney, Agent, or Firm*—Milad G. Shara, Esq.; Robroy R. Fawcett, Esq

(57) ABSTRACT

A disk drive that includes a base, a magnetic disk, a rotary actuator that carries a head for reading and writing data from the disk in a track-following mode under the control of a servo control system, and at least two sensors—one fixed sensor rigidly coupled to the overall disk drive and one mobile sensor mounted to the rotating actuator—for differentially detecting accelerations of the rotary actuator relative to the overall disk drive and its disk. The disk drive detects and actively compensates for accelerations imparted to a balanced actuator that has an effective imbalance. The fixed sensor is preferably mounted to a PCBA that is secured to the base. The mobile sensor is preferably mounted to an actuator arm of the rotary actuator, as far outboard as possible, and so as to align with the fixed sensor as the rotary actuator swings through its range of travel. The preferred sensors are linear accelerometers.

17 Claims, 5 Drawing Sheets

DISK DRIVE HAVING SEPARATE MOTION SENSORS FOR BASE AND ACTUATOR

FIELD OF THE INVENTION

The present invention relates generally to magnetic disk drives and, more particularly, to active vibration cancellation within a disk drive using a multitude of accelerometers.

BACKGROUND OF THE RELATED ART

Magnetic disk drives generally read and write data on the surface of a rotating magnetic disk with a transducer or "head" that is located at the far end of a moveable actuator. A servo control system uses servo control information recorded amongst the data, or on a separate disk, to controllably move the transducer from track to track ("seeking") and to hold the transducer at a desired position ("track following"). A detailed discussion of servo control systems is unnecessary because such systems are well known as set forth, for example, in patent application Ser. No. 09/138,841 that was filed on Aug. 24, 1998, entitled "DISK DRIVE CAPABLE OF AUTONOMOUSLY EVALUATING AND ADAPTING THE FREQUENCY RESPONSE OF ITS SERVO CONTROL SYSTEM," and is commonly owned by the assignee of this application.

The industry has previously mounted various kinds of accelerometers on the disk drive in order to sense external forces.

One example is U.S. Pat. No. 5,426,545 entitled "Active Disturbance Compensation System for Disk Drives." This patent discloses an angular acceleration sensor 22 that comprises an opposed pair of linear accelerometers 22a and 22b. The invention is intended for use with balanced actuator assembly 26. The overall sensor package 22 is mounted to the HDA 10 or drive housing, as shown in FIG. 1, in order to detect and correct for angular acceleration about the axis 27 of the balanced actuator assembly 26 that would otherwise produce a radial position error 30 (FIG. 2) due to the actuator's inertial tendency to remain stationary in the presence of such acceleration.

U.S. Pat. No. 5,521,772 entitled "Disk Drive with Acceleration Rate Sensing" discloses a variation on that theme in that it uses an "acceleration rate sensor" 50 rather than a linear acceleration sensor (conventional accelerometer) or angular acceleration sensor. The sensor 50 is mounted to the disk drive housing 9.

U.S. Pat. No. 5,663,847 is yet another patent disclosing an angular accelerometer in a disk drive. It is entitled "Rejection of Disturbances on a Disk Drive by Use of an Accelerometer." In FIG. 1, the '847 patent discloses an angular accelerometer 102 that is mounted to the drive's base plate 104 in order to sense rotational motion 110. The '847 patent is similar to the '545 patent in that both are addressing the problem that when the disk drive containing a balanced actuator is bumped rotationally in the plane of the disk 112, a position error will arise because "the actuator 114 will retain its position in inertial space . . . " (4:19–21).

PCT Application WO 97/02532 discloses another apparent use of an accelerometer that is described therein as a "shock sensor" 46 (See FIG. 3). This application is entitled "Disk Drive Data Protection System". The WO 97/02532 application appears similar to the remainder of the presently known art in that it appears to disclose a single sensor that is mounted to the drive housing. According to the disclosure, the shock sensor 46 detects "physical shocks to the disk drive which may compromise data being transferred . . . "

Conventional systems mount a single accelerometer to the overall disk drive and disable reading and/or writing when the output of the accelerometer surpasses a threshold. The '545 patent discussed above is different in that it uses a angular acceleration sensor mounted to the overall disk drive to indicate when the drive is being shocked or vibrated about the pivot axis of a balanced actuator. However, it is only sensitive to rotational motion and it assumes that the actuator is a perfectly balanced actuator.

The foregoing uses of accelerometers are incapable of accurately detecting a motion of the head relative to the remainder of the disk drive and are subject, therefore, to an off-track condition due to acceleration of an imbalanced actuator. There remains a need, therefore, for a disk drive that detects the motion of the actuator relative to the disk drive and implements active vibration cancellation using a multitude of sensors.

SUMMARY OF THE INVENTION

The invention may be regarded as a disk drive comprising a head disk assembly 20 including a base 21, a rotating disk 23, and a rotary actuator 50 that pivots relative to the base; a first motion sensor 35 rigidly mounted relative to the base for sensing motion of the head disk assembly; and a second motion sensor 55 mounted to the rotary actuator for sensing motion of the rotary actuator relative to the motion of the head disk assembly. In a more particular embodiment, the first motion sensor is rigidly mounted relative to the base to output a first sense signal, the second motion sensor is mounted to the rotary actuator to output a second sense signal, and the disk drive further includes a means for controlling a disk function in response to a comparison of the first and second sense signals.

The invention may also be regarded as a method of controlling a disk drive having a head disk assembly 20 including a base 21, a rotating disk 23, and a rotary actuator 50 that pivots relative to the base, in order to achieve improved track following performance by reducing off-track error caused by shock and vibration, the method comprising the steps of: generating a first sense signal corresponding to a motion of the head disk assembly; generating a second sense signal corresponding to a motion of the rotary actuator relative to the motion of the head disk assembly; comparing the first and second sense signals in order to detect off-track movement of the rotary actuator while track-following; and compensating for the off-track movement. In a preferred embodiment of the method, the step of generating a first sense signal corresponding to a motion of the head disk assembly is accomplished by mounting a first motion sensor 35 rigidly relative to the base and the step of generating a second sense signal corresponding to a motion of the rotary actuator relative to the motion of the head disk assembly is accomplished by mounting a second motion sensor 55 to the rotary actuator that pivots relative to the base.

BRIEF DESCRIPTION OF THE DRAWINGS

The just summarized invention can be best understood with reference to the following description taken in view of the drawings of which.

DETAILED DESCRIPTION OF THE PREFERRED EMBODIMENT

Figure 1:
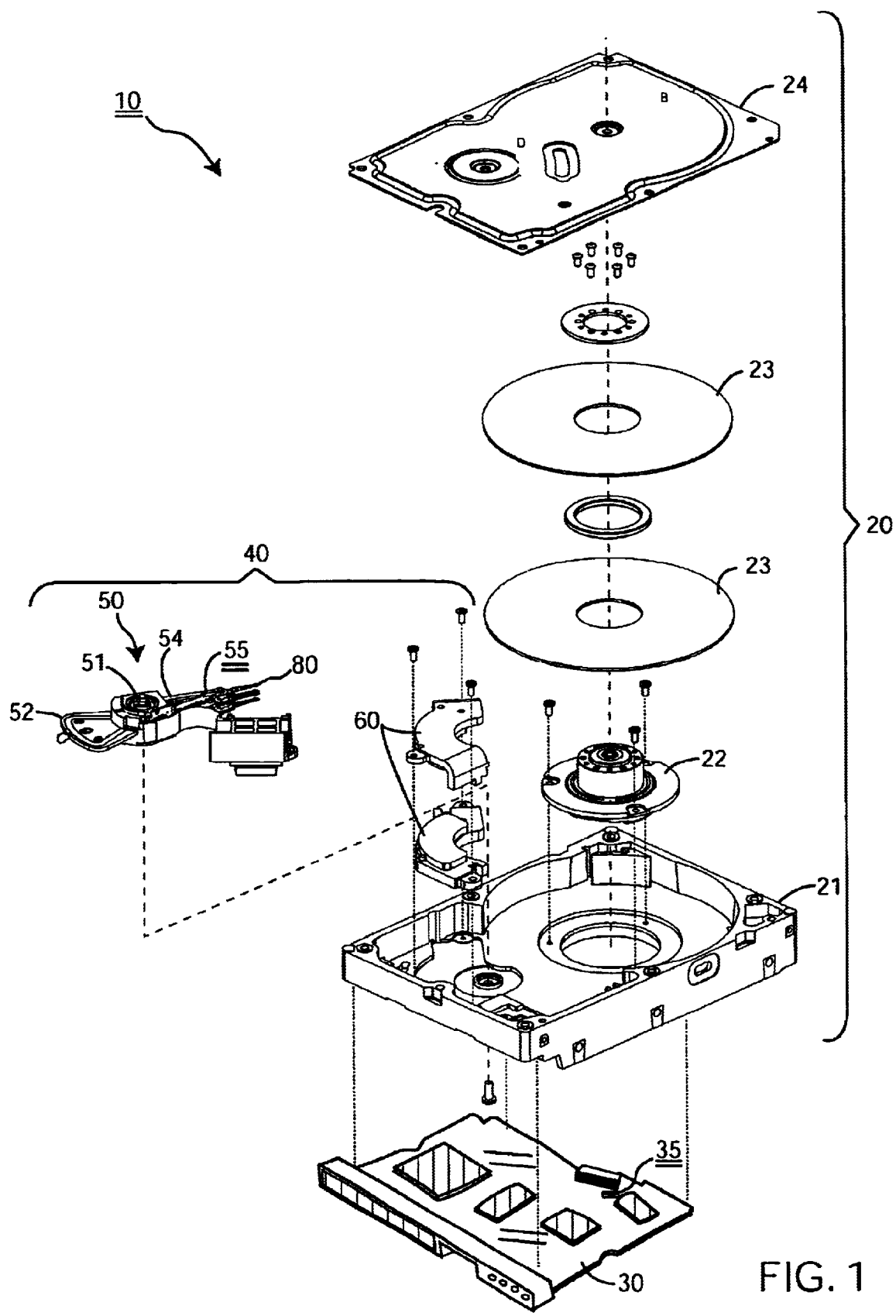
FIG. 1 is an exploded perspective view of a magnetic disk drive 10 according to a preferred embodiment of the invention, the disk drive having a head disk assembly 20 ("HDA") that contains a magnetic disk 23, a rotary actuator 50, a first acceleration sensor 35 that moves rigidly with the HDA 20 and a second acceleration sensor 55 that rotates with the rotary actuator 50.

FIG. 1 shows a preferred embodiment of a disk drive 10 according to this invention. As shown, the disk drive 10 comprises a head disk assembly ("HDA") 20 including a base 21, a rotating disk 23, and a rotary actuator 50 that pivots relative to the base 21. In this first embodiment, the disk drive 10 further comprises a first motion sensor 35 rigidly mounted relative to the base 21 for sensing motion of the HDA 20, and a second motion sensor 55 mounted to the rotary actuator 50 for sensing motion of the rotary actuator 50, both with and relative to the motion of the HDA 20.

There are preferably two sensors 35, 55, but it is possible to use more than two sensors in a more complicated differential arrangement. The preferred sensors 35, 55 are linear accelerometers with a single sense axis 35s, 55s (see FIG. 2), but multi-axis sensors and other types of motion sensors altogether may also be used in a differential mode in accordance with this invention.

In the preferred embodiment, a PC Board Assembly (PCBA) 30 that contains suitable control electronics is rigidly mounted to an underside of the base 21. The disk 23 is rotated by a spindle motor 22. The rotary actuator 50 rotates about a pivot axis extending through a center of a pivot cartridge 51 that secures the actuator 50 to the base 21, adjacent to the disk 23. An actuator arm 54 extends to one side in order to carry a head 80 over the disk 23 for reading and writing data therefrom and a voice coil 52 extends from the other side for interacting with a pair of permanent magnets 60. The voice coil 52 and magnets 60 are frequently regarded as a "voice coil motor", or VCM 40. A cover plate 24 encloses the foregoing components in a cavity within the base 21.

The first sensor 35 is rigidly coupled to the base 21. In the preferred embodiment, it is indirectly mounted to the base 21 by being mounted to the PCBA 30 that is itself rigidly mounted to the base 21. It is possible, of course, to mount the first sensor 35 directly to the base 21, or to mount it to any other structure that is, in turn, fixed to the base 21. The second sensor 55 is mounted to the rotary actuator 50. It is desirable to provide maximal sensitivity to rotational actuator motion. As such, the second sensor 55 is preferably positioned on the actuator arm 55, as far as possible from the pivot cartridge 51. The second sensor 55, however, may be located elsewhere on the actuator 50, such as on the voice coil 52. Such placement however must be done while maintaining vertical registration with first sensor 35 as discussed below.

Figure 5:
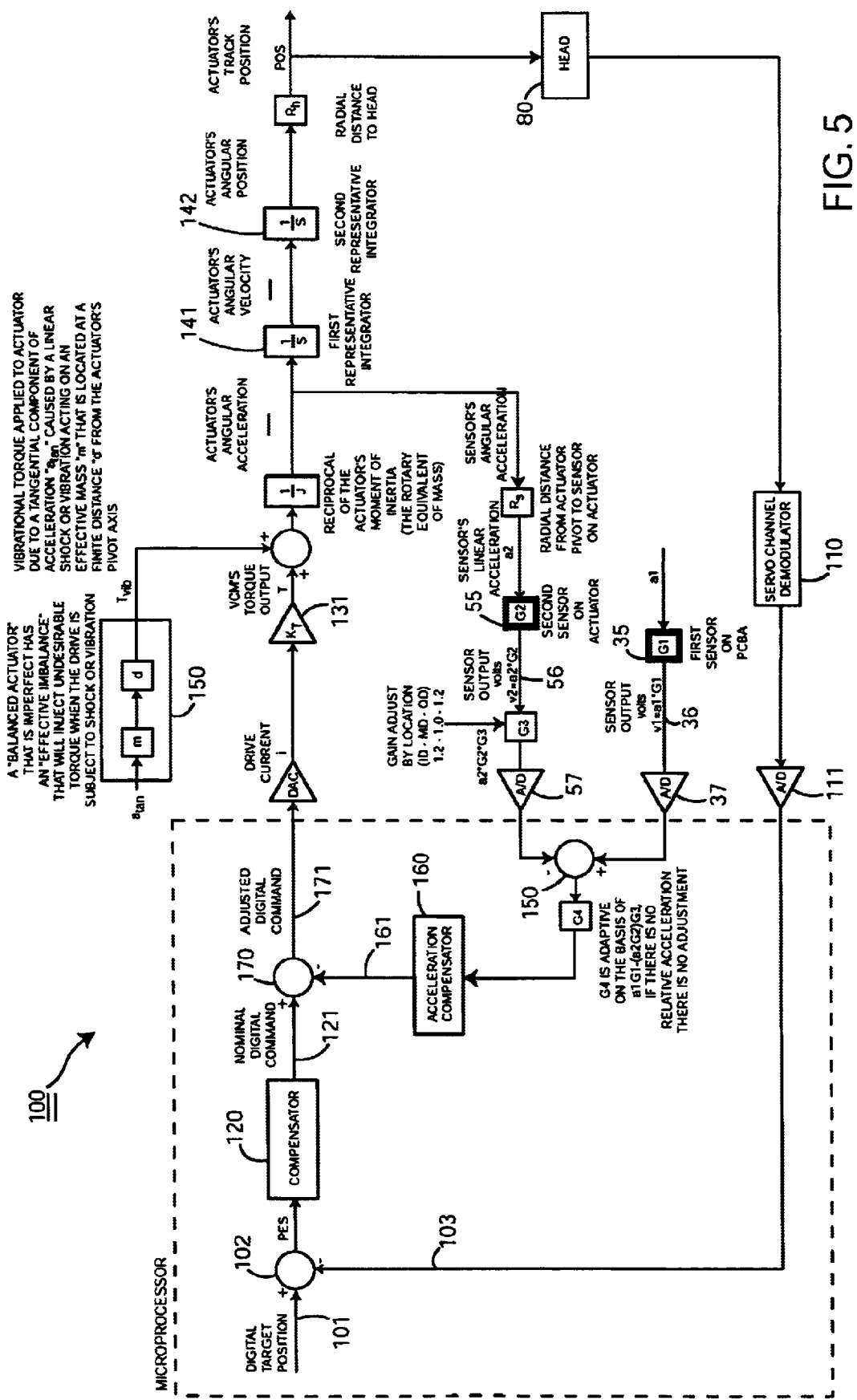
FIG. 5 is schematic diagram of a simplified system model for a microprocessor-based embodiment wherein the first and second sensors 35, 55 are used to compensate for motion that is otherwise undesirably imparted to the rotary actuator 50 by shock and vibration.

As shown in FIG. 5, discussed in more detail below, the first sensor 35 that is rigidly mounted relative to the base 21 outputs a first sense signal and the second sensor 55 that is mounted to the rotary actuator 50 that pivots relative to the base 21 outputs a second sense signal 56. The preferred embodiment further comprises suitable means for controlling a motion of the actuator in response to a comparison of the first and second sense signals 36, 56. The preferred means for controlling uses suitable hardware and/or firmware on the PCBA 30 to implement the control system shown in FIG. 5, but other more or less complicated control means are possible.

Figure 2:
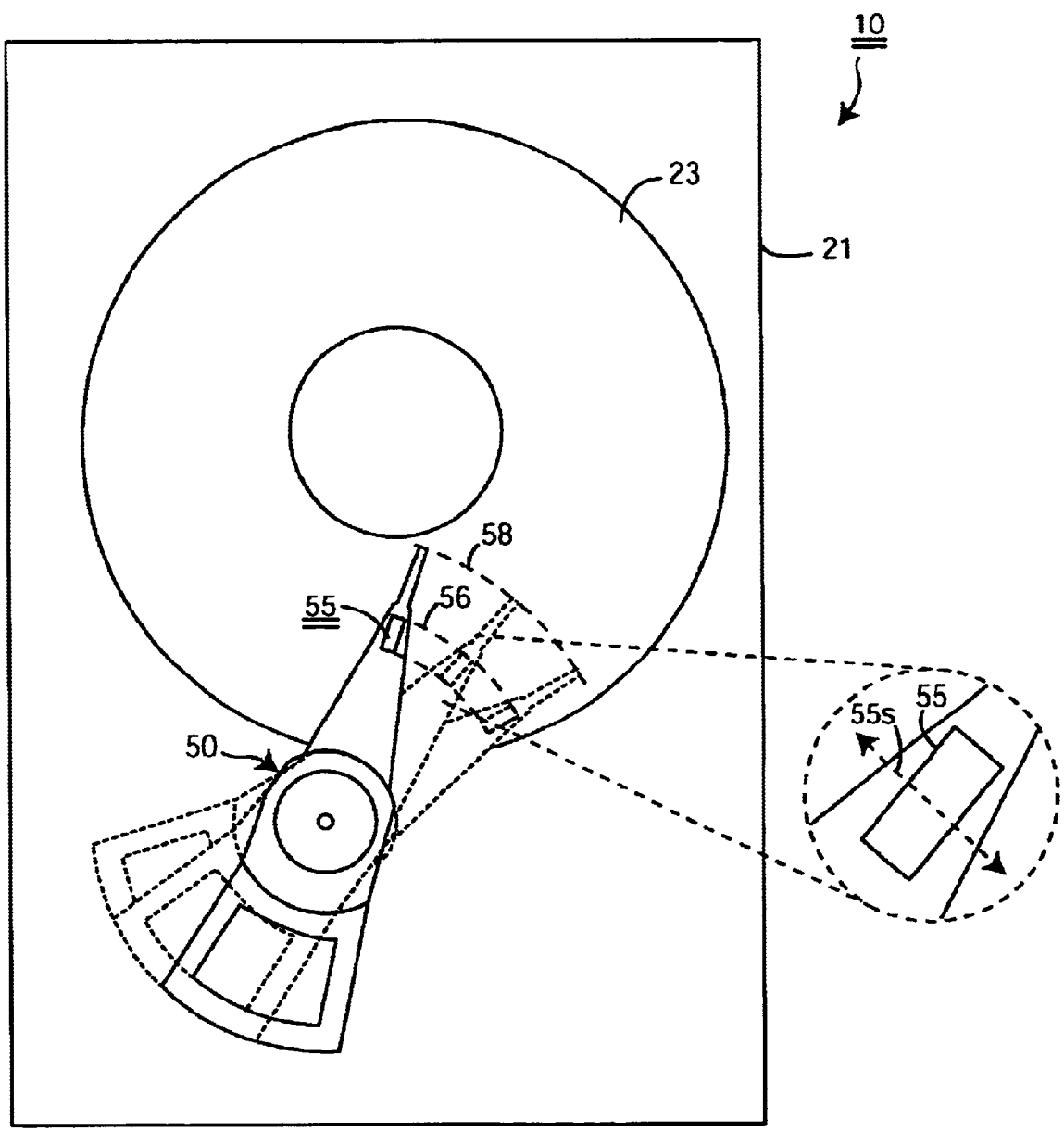
FIG. 2 is a simplified plan view of the disk drive 10 showing how a head 80 carried by the rotary actuator 50 moves through a first arc 58 and how the second sensor 55 carried by the rotary actuator 50 moves through a second arc 56.

FIG. 2 is a simplified plan view of the disk drive 10 showing how the head 80 that is carried by the rotary actuator 50 moves through a first arc 58, while the second sensor 55 moves through a second arc 56, as the rotary actuator 50 moves from the inner diameter (ID), to the middle diameter (MD), to the outer diameter (OD), and back again. The second sensor 55 is preferably mounted on the actuator arm 50 such that its sense axis 55s is perpendicular to the long axis of the actuator 50As such, the sense axis 55s is perpendicular to the length of the actuator 50 and tangential to the arc 56 that is traversed by the sensor 55 and the arc 58 that is traversed by the head 80. In this manner, any component of acceleration that tends to move the head 80 off-track, is maximally imparted to the second sensor 55.

The second sensor's sense axis 36 is preferably aligned with the first sensor's sense axis when the actuator is at the MD. The angular extent of the arc 58 is relatively small, but it is still necessary to consider the fact that the second sensor's sense axis 55s will sometimes be aligned and sometimes be skewed relative to the first sensor's sense axis 35s throughout the actuator's range of motion. At the ID and OD, or course, the sense axis 55s is slightly skewed from the ideal and the gain of the second sensor will be reduced relative to the first sensor 55. As discussed below, however, the preferred embodiment compensates for the skew between the sense axes 35s, 55s when the actuator 50 is at the ID or the OD, and not at the MD.

Figure 3:
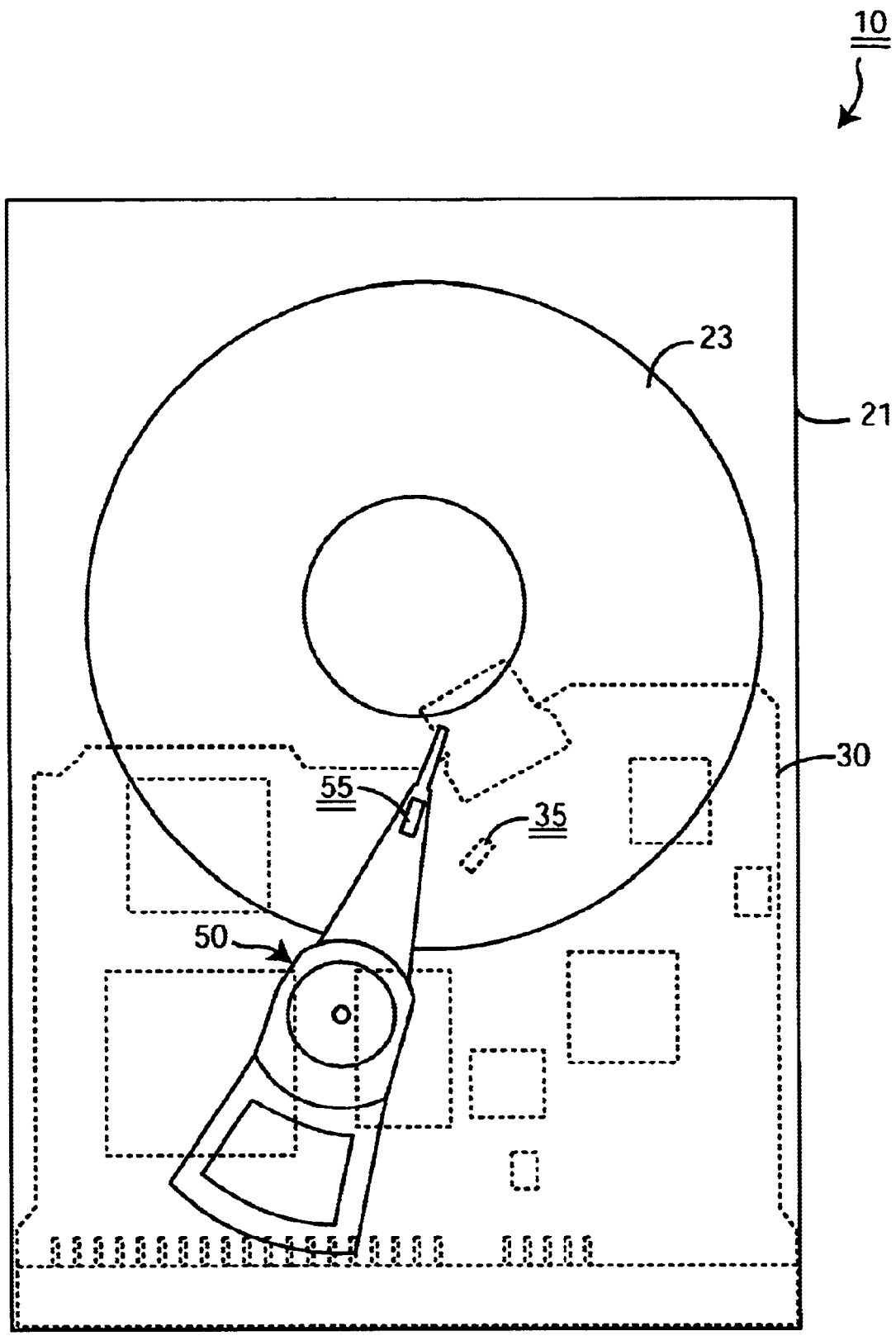
FIG. 3 is a simplified plan view of the disk drive 10 showing the PCBA 30 that carries the first sensor 35 below the rotary actuator 50 that carries the second sensor 55.

FIG. 3 is a simplified plan view of the disk drive 10 showing the PCBA 30 that carries the first sensor 35 vertically registered with the second sensor 55 carried by the rotary actuator 50 when the rotary actuator is at the MD. In this preferred arrangement, the first sensor 35 is located below the second sensor 55, but their respective sense axes 35s, 55s are substantially perpendicular to the long axis of the actuator 50 and aligned with one another when the actuator 50 is as the MD.

Figure 4:
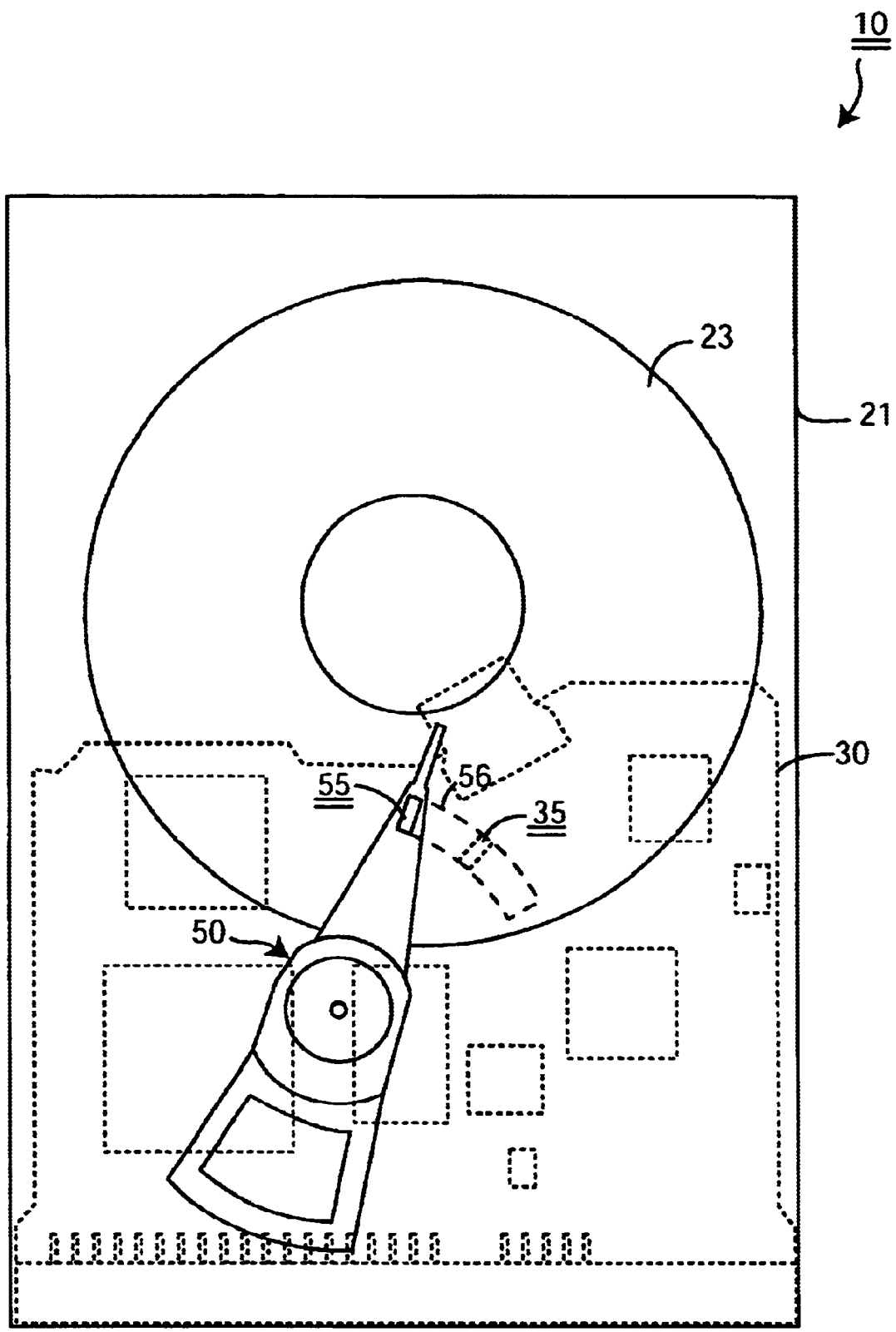
FIG. 4 is a simplified plan view of the disk drive 10 showing that the second sensor 55 is preferably located over the first sensor 35 when the rotary actuator 50 is at a middle diameter of the disk 23.

FIG. 4 is a simplified plan view of the preferred disk drive 10 showing that the second sensor 55 preferably moves over the first sensor 35 as the actuator 50 moves from the ID, to the MD, to the OD, and back again. The second sensor's arc of motion 56, in other words, preferably travels over the first sensor 35. FIG. 4 also further shows that the second sensor 55 is located directly over the first sensor 35 when the rotary actuator 50 is at the MD of the disk 23. It is possible, however, that the sensors 35, 55 are located in such places that they are never in vertical alignment at any point in the actuator 50's range of motion. In such case, however, larger gain adaptations will be required to maintain comparable signals, thereby increasing the likelihood of errors.

FIG. 5 is simplified diagram of a control system model that is used for controlling a disk drive 10 in order to achieve improved track following performance by reducing off-track error caused by shock and vibration. A preferred method of controlling a disk drive comprises the steps of generating a first sense signal corresponding to a motion of the head disk assembly; generating a second sense signal corresponding to a motion of the rotary actuator relative to the motion of the head disk assembly; comparing the first and second sense signals in order to detect off-track movement of the rotary actuator while track-following; and compensating for the off-track movement.

The preferred method may be readily understood by referring to FIG. 5 in conjunction with FIGS. 1–4. In operation, the first and second sensors 35, 55 are used to generate the first and second sense signals 36, 56 in the presence of shock and vibration, those sense signals are compared by a junction 150 to detect any resulting off-track motion, and suitable hardware and firmware is used to compensate for torque that is otherwise undesirably imparted to the rotary actuator 50 by the shock and vibration.

In normal operation, the control system 100 receives a digital target position 101 in accordance with a request from a host computer (not shown). An indicated position 103 is also available on a periodic basis by virtue of servo control signals that are periodically read by the head 80, processed through a servo channel demodulator 110, and converted to a digital value by an A/D converter 11a.

A summing junction 102 subtracts the indicated position 103 from the target position 101 to produce a position error signal PES that is provided to a suitable compensator 120 to produce a nominal digital command 121 that, ordinarily, would be provided without any compensation for vibration, to a digital-to-analog converter DAC that produce an analog current "i" for accelerating the VCM 40 (see FIG. 1) in accordance with the magnitude of the PES.

As suggested by the gain block 131, the drive current "i" is nominally converted to a torque T according to a torque conversion factor, $K_T$, where $T=i*K_T$. The applied torque, of course, accelerates the rotary actuator 50 at an angular acceleration $$\frac{d^2\theta}{dt^2}$$

that is a function of the applied torque T and the actuator's angular moment of inertia J. Over time, as suggested by the simplified $$\frac{1}{s}$$

system blocks 141, 142, the acceleration $$\frac{d^2\theta}{dt^2}$$

results in an angular velocity $$\frac{d\theta}{dt}$$

and an angular position θ. A change in the angular position Δθ causes the head 80 to move by along the arc 58 (see FIG. 2) as a function of the radial distance $R_h$ from the pivot cartridge 51 to the head 80. Ultimately, the head 80 is located a particular track position POS over the disk 23 and, as already discussed, that position POS is detected and returned for comparison with the target position 101.

The rotary actuator 50 shown in FIGS. 1–4 is a "balanced actuator" in that the center of mass is designed to be located precisely at the pivot axis such that external accelerations will not generate a relative acceleration between the actuator 50 and the base 21. As a practical matter, however, many rotary actuators 50 are shipped with an operational or effective imbalance even though they are nominally balanced.

As suggested by block 150, an actuator 50 with an effective imbalance has a center of mass located at some distance d from the pivot axis. Such an actuator 50 is detrimentally subject to an angular acceleration whenever a linear shock or vibration imparts a force to the off-axis mass. The result is the injection of an undesired torque $T_{vib}$ that tends to cause the head 80 to move off-track even while the servo control system is in a track-following mode. An inability to control the actuator 50 in the face of such undesired vibration detrimentally requires a coarser track pitch design than might otherwise be used, makes it possible that the system will have to re-read a data track, and worse yet, makes it possible that the head 80 will over-write an adjacent track when recording data.

In accordance with the present invention, however, two sensors 35, 55 may be uniquely used in order to detect and compensate for such undesired acceleration of the actuator 50. Moreover, because of the differential approach, the system is also capable of detecting motion due to both linear and rotational shock and vibration.

As shown in FIG. 5, accelerations a1, a2 imparted to the first and second sensors 35, 55 results in two corresponding sensor signals 36, 56 that, subject to suitable gain adjustments, are differentially compared at a junction 150. Accordingly, if the disk drive 10 were subject to a linear shock or vibration that resulted in the head 80 moving with the disk 23 (as it would were the actuator 50 perfectly balanced), then the sensors would also move together, the sensor signals 36, 56 would be identical, and the output of the junction 150 would be zero, i.e. no compensation would be needed and none would take place. On the other hand, if the actuator has an effective imbalance, then a linear shock or vibration that causes the head 80 to move relative to the disk 23 would be reflected as a difference between the first and second signals 36, 56. As such, the junction 150 would produce a net value and that value, after suitable treatment though an acceleration compensator 160 to produce a compensated signal 161, would be combined (added or subtracted as appropriate) with the nominal digital command 121, at junction 170, to produce an adjusted digital command 171. Preferably an adaptive gain stage G4 is coupled between junction 150 and acceleration compensator 160 for adjusting signal gain on the basis of the formula: a1G1–(a2G2)G3.

As a result of this approach, the system 100 will actively work to cancel shock and vibration that would otherwise undesirably move the actuator 50 and the head 80 away from a desired track-following position.

As shown in FIG. 5, the preferred system 100 includes a gain adjust block G3 that accounts for skewing between the sense axis of the two sensors 35, 55. In particular, the gain block G3 adaptively modifies the gain of the second sensor 55 that is mounted on the actuator 50 based on the location of the actuator 50. When the actuator is located at the MD, the gain would be 1.0, whereas the gain at the ID or OD would increase to a larger amount (e.g. 1.2) in order to account for skew.

As can now be understood by reference to FIGS. 1–5 and the above description, the preferred method of generating a first sense signal 35 corresponding to a motion of the head disk assembly 20 is accomplished by mounting a first motion sensor 35 rigidly relative to the base 21 and the preferred method of generating a second sense signal 56 corresponding to a motion of the rotary actuator 50 relative to the motion of the head disk assembly 20 is accomplished by mounting a second motion sensor 55 to the rotary actuator 50 that pivots relative to the base 21.

The compensating step is preferably accomplished, as shown in FIG. 5, by modifying a nominal digital command 121 in a servo control loop with a digital value 161 corresponding to the result of the comparing step.

As discussed above, the step of generating a first sense signal is preferably accomplished with a linear accelerometer 35 that has its sense axis 35s substantially, tangentially aligned with an arc 86 that is traversed by a head 80 carried by the rotary actuator 50. In such case, the step of mounting the second linear accelerometer 55 on the rotary actuator 50 is preferably accomplished with its sense axis 55s substantially aligned with the sense axis 35s of the first linear accelerometer 35 when a read/write head 80 supported by the rotary actuator 50 is located over a middle diameter of the rotating disk 23.

Finally, the preferred method includes the further step of adjusting a compensation factor G3 to account for skew that exists between the sense axes 35s, 55s of the first and second linear accelerometers 35, 55 when the read/write head 80 supported by the rotary actuator 50 is located at the inside or outside diameter of the rotating disk 23.

The preferred system 100 of FIG. 5 is a microprocessor implementation characterized by translation from digital-to-analog using a DAC, and back again using A/D converters 37, 57,111. In this particular embodiment, the vibration compensation is accomplished digitally because it is most convenient. It is possible, of course, that the vibration cancellation could be implemented in a purely analog system, or in an analog portion of a hybrid system.

What is claimed is:

1. A disk drive, comprising:
   a head disk assembly including a base, a rotating disk, and a rotary actuator that pivots relative to the base;
   a first motion sensor rigidly coupled to the base for sensing motion of the head disk assembly, wherein the first motion sensor outputs a first sense signal;
   a second motion sensor mounted to the rotary actuator for sensing motion of the rotary actuator, wherein the second motion sensor outputs a second sense signal; and
   means for controlling a motion of the rotary actuator in order to cancel the effects of vibration in response to a comparison of the first and second sense signals.

2. The disk drive of claim 1 wherein the rotary actuator includes an actuator arm and wherein the second motion sensor is mounted to the actuator arm.

3. The disk drive of claim 1 wherein the first and second motion sensors comprise first and second linear accelerometers.

4. A disk drive, comprising:
   a head disk assembly including a base, a rotating disk, and a rotary actuator that pivots relative to the base;
   a first motion sensor rigidly coupled to the base for sensing motion of the head disk assembly, wherein the first motion sensor rigidly coupled to the base is mounted to a PCBA that is rigidly secured to the base; and
   a second motion sensor mounted to the rotary actuator for sensing motion of the rotary actuator.

5. The disk drive of claim 4 wherein the rotary actuator includes an actuator arm and wherein the second motion sensor is mounted to the actuator arm.

6. A disk drive, comprising:
   a head disk assembly including a base, a rotating disk, and a rotary actuator that pivots relative to the base;
   a first motion sensor rigidly coupled to the base for sensing motion of the head disk assembly; and
   a second motion sensor mounted to the rotary actuator for sensing motion of the rotary actuator, wherein the first and second motion sensors are substantially vertically aligned when the rotary actuator is at a particular position relative to the rotating disk.

7. A disk drive, comprising:
   a head disk assembly including a base, a rotating disk, and a rotary actuator that pivots relative to the base;
   a first motion sensor rigidly coupled to the base for sensing motion of the head disk assembly; and
   a second motion sensor mounted to the rotary actuator for sensing motion of the rotary actuator, wherein the first and second motion sensors are substantially vertically aligned when the rotary actuator is at a particular position where a read/write head supported by the rotary actuator is located over a middle diameter of the disk.

8. A disk drive, comprising:
   a head disk assembly including a base, a rotating disk, and a rotary actuator that pivots relative to the base;
   a first motion sensor rigidly coupled to the base for sensing motion of the head disk assembly; and
   a second motion sensor mounted to the rotary actuator for sensing motion of the rotary actuator, wherein the first and second motion sensors comprise first and second linear accelerometers, and the second linear accelerometer has its sense axis substantially perpendicular to a long axis of the rotary actuator.

9. The disk drive of claim 8 wherein the first linear accelerometer has its sense axis substantially aligned with the sense axis of the second linear accelerometer when a read/write head supported by the rotary actuator is located over a middle diameter of the disk.

10. The disk drive of claim 9 wherein a compensation factor is used to account for skew that exists between the sense axes of the first and second linear accelerometers when the read/write head supported by the rotary actuator is located at the inside or outside diameter of the disk.

11. A method of controlling a disk drive having a head disk assembly including a base, a rotating disk, and a rotary actuator that pivots relative to the base, in order to achieve improved track following performance by reducing off-track error caused by shock and vibration, the method comprising the steps of:
   generating a first sense signal corresponding to a motion of the head disk assembly;
   generating a second sense signal corresponding to the motion of the rotary actuator;
   comparing the first and second sense signals in order to detect off-track movement of the rotary actuator while track-following; and
   compensating for the off-track movement.

12. The method of claim 11 wherein the step of generating a first sense signal corresponding to a motion of the head disk assembly is accomplished by rigidly coupling a first motion sensor to the base.

13. The method of claim 11 wherein the step of generating a second sense signal corresponding to a motion of the rotary actuator is accomplished by mounting a second motion sensor to the rotary actuator that pivots relative to the base.

14. A method of controlling a disk drive having a head disk assembly including a base, a rotating disk, and a rotary actuator that pivots relative to the base, in order to achieve improved track following performance by reducing off-track error caused by shock and vibration, the method comprising the steps of:

generating a first sense signal corresponding to a motion of the head disk assembly;

generating a second sense signal corresponding to the motion of the rotary actuator;

comparing the first and second sense signals in order to detect off-track movement of the rotary actuator while track-following; and compensating for the off-track movement by modifying a nominal digital command in a servo control loop with a digital value corresponding to the result of the comparing step.

15. A method of controlling a disk drive having a head disk assembly including a base, a rotating disk, and a rotary actuator that pivots relative to the base, in order to achieve improved track following performance by reducing off-track error caused by shock and vibration, the method comprising the steps of:

generating a first sense signal corresponding to a motion of the head disk assembly;

generating a second sense signal corresponding to the motion of the rotary actuator with a linear accelerometer that has its sense axis substantially perpendicular to a long axis of the rotary actuator;

comparing the first and second sense signals in order to detect off-track movement of the rotary actuator while track-following; and compensating for the off-track movement.

16. The method of claim 15 further comprising the step of mounting a first linear accelerometer with its sense axis substantially aligned with the sense axis of the second linear accelerometer when a read/write head supported by the rotary actuator is located over a middle diameter of the rotating disk.

17. The method of claim 16 further comprising the step of adjusting a compensation factor to account for skew that exists between the sense axes of the first and second linear accelerometers when the read/write head supported by the rotary actuator is located at the inside or outside diameter of the rotating disk.

* * * * *